April 8, 1969  V. STARK ET AL  3,437,098
SYSTEM OF AUTOMATIC CONTROLS FOR GAS MIXING
Filed Oct. 25, 1965

| VALVES | FOUR VALVES | | | |
|---|---|---|---|---|
| | THREE VALVES | | | |
| | 1 | 2 | 3 | 4 |
| STEP 1 | X | — | — | — |
| 2 | — | X | — | — |
| 3 | X | X | — | — |
| 4 | — | — | X | — |
| 5 | X | — | X | — |
| 6 | — | X | X | — |
| 7 | X | X | X | — |
| 8 | — | — | — | X |
| 9 | X | — | — | X |
| 10 | — | X | — | X |
| 11 | X | X | — | X |
| 12 | — | — | X | X |
| 13 | X | — | X | X |
| 14 | — | X | X | X |
| 15 | X | X | X | X |

LEGEND
— CLOSED
X OPEN

INVENTORS
Virgil Stark &
Jacques Sliosberg
BY
Holcombe, Watherill & Brisebois
ATTORNEYS

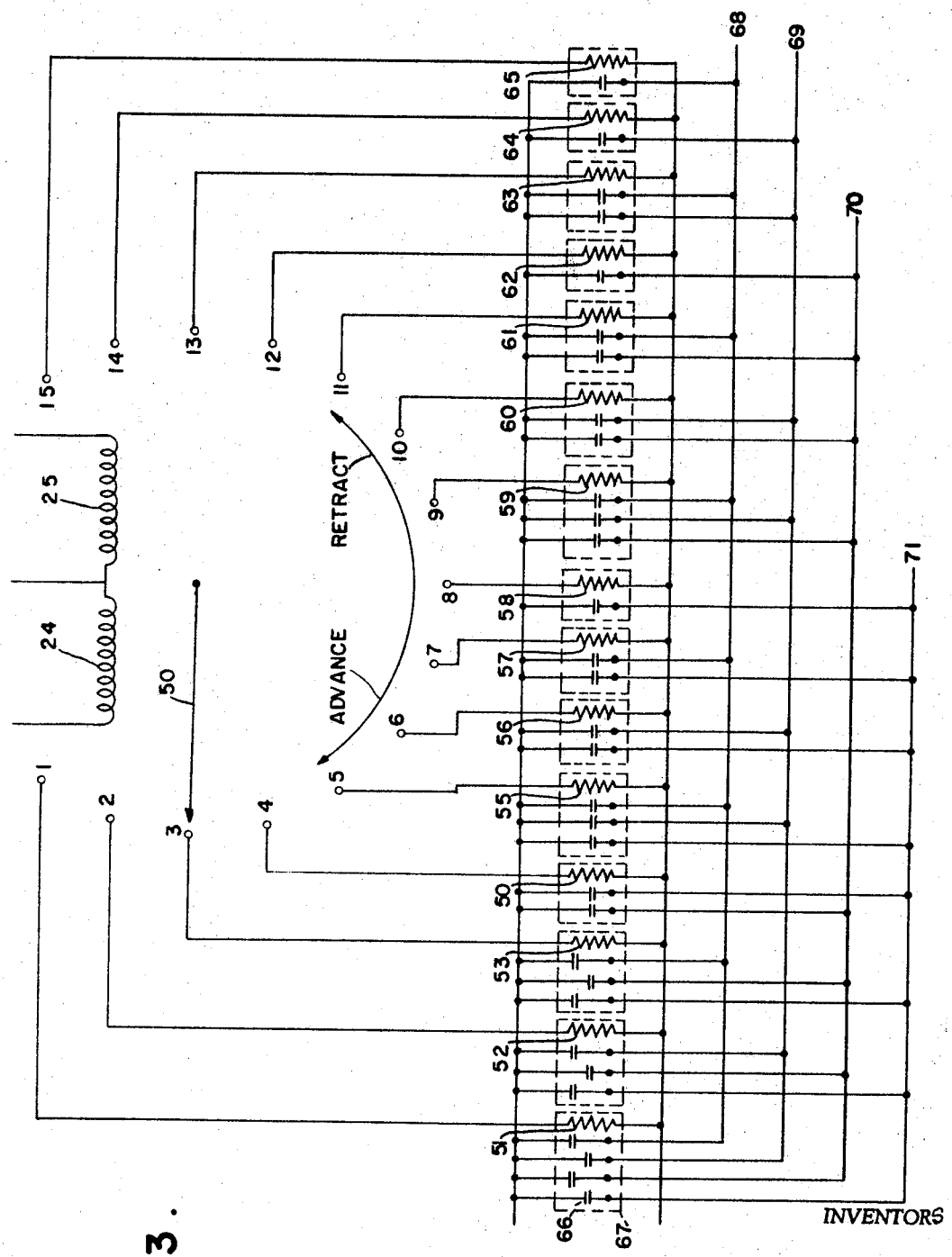

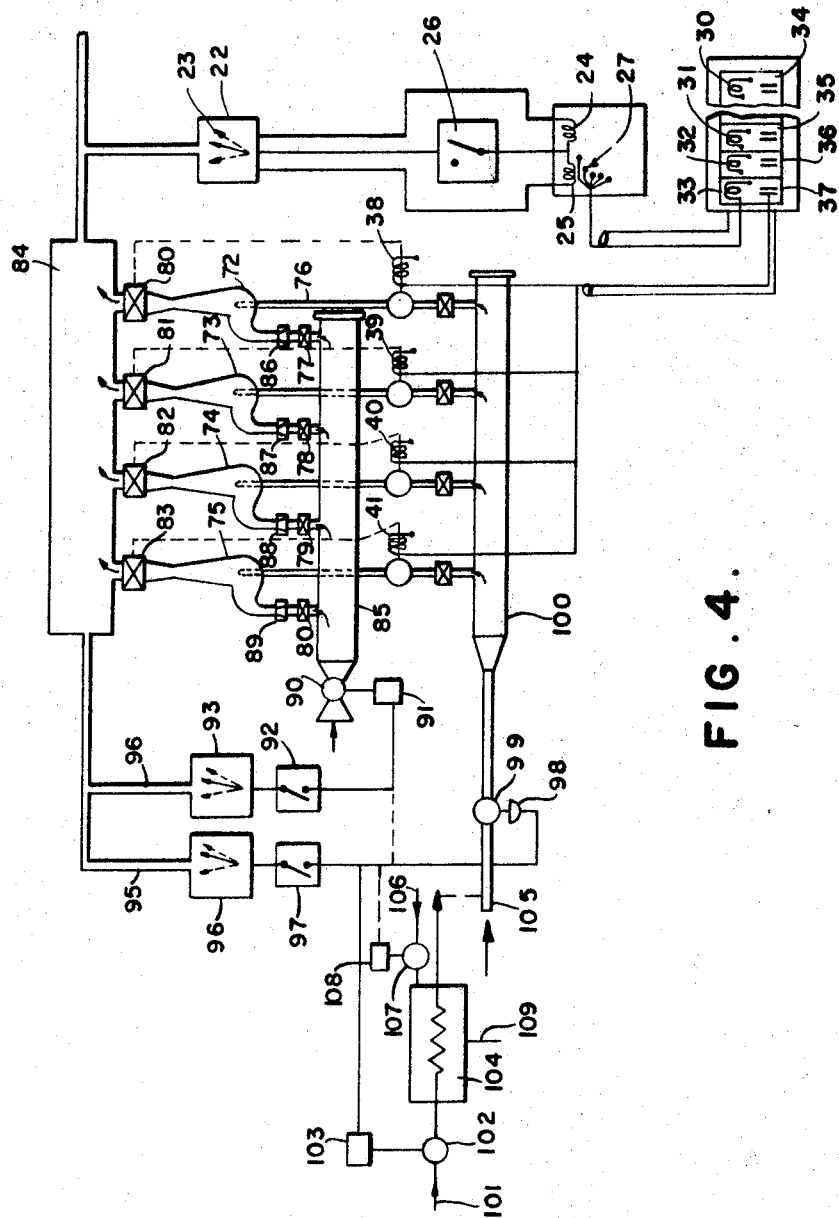

United States Patent Office 3,437,098
Patented Apr. 8, 1969

3,437,098
SYSTEM OF AUTOMATIC CONTROLS FOR GAS MIXING
Virgil Stark and Jacques Sliosberg, New York, N.Y., assignors to North American Utility Construction Corporation, New York, N.Y.
Filed Oct. 25, 1965, Ser. No. 505,149
Int. Cl. F16k *31/12, 37/00;* F17d *3/00*
U.S. Cl. 137—12                                    13 Claims

ABSTRACT OF THE DISCLOSURE

The method of controlling the mixing and supply of a fluid to a demand that varies in the supply line, comprising; providing a plurality of fluid sources to a supply line, wherein the flow rate of each fluid source is independent of the flow rate of the other members of the plurality of sources, connecting each member of the plurality of sources to the supply line so that the number of sources operating simultaneously governs the total flow rate, periodically determining the pressure in the supply line at a preset time interval and comparing this pressure with a preset normal pressure for the supply line operation, and periodically controlling the total flow rate by deviation from said preset normal pressure at said preset timed intervals.

---

This invention relates to the process and apparatus interposed between a source of fluid supply and a distribution manifold for the fluid whereby there is electrically maintained in the manifold a constant supply of fluid with varied demand needs for the fluid existing from the manifold.

In the prior art pneumatic control is used or proportional constant controls are used without periodic selective timing. These systems are elaborate, require complicated equipment, and their operation results in pressure surges which may not be allowable.

It is an object of the present invention to overcome these objectionable characteristics of the prior art.

It is a further object of the present invention to provide a method and apparatus for the distribution of a fluid with a substantially constant pressure and variable volume in a simple manner.

It is a further object of the invention to provide a method and apparatus that will accomplish the above objects with conventional types of apparatus.

A further object of this invention is to provide for the operation of jet inductors that will aspirate a fluid or fluids in controlled quantity with or without using a control means on the fluid that is aspirated by the jets.

A further object of this invention is to provide a simple system of control of fluid distribution over a wide range of pressure and volume.

A further object of this invention is to provide a selective timing so that the flow of the fluid mixture is adjusted to the demand at preselected intervals.

A further object of this invention is to provide controls so as to change the mixture of fluids by adjusting the flow on more than one fluid so as to obtain a mixture of fluids of desired specifications at all times and in accordance with the demand.

A further object of this invention is to provide an automatic system so as to obtain by a number of controls a final mixture as desired in an automatic way without manual controls.

The various features of novelty which characterize the invention are pointed out with particularity in the claims annexed to and forming part of this specification. For a better understanding of the invention, however, its advantages and specific objects obtained with its use, reference is made to the accompanying drawings and descriptive matter in which is illustrated and described a preferred embodiment of the invention.

In the drawings:

FIG. 3 is a diagrammatic illustration of a rotating switch controlling each valve on the plurality of fluid sources.

FIG. 4 is a diagrammatic illustration of a variation of FIG. 1 wherein other fluids are induced into the manifold supply.

Figures 1, 2:
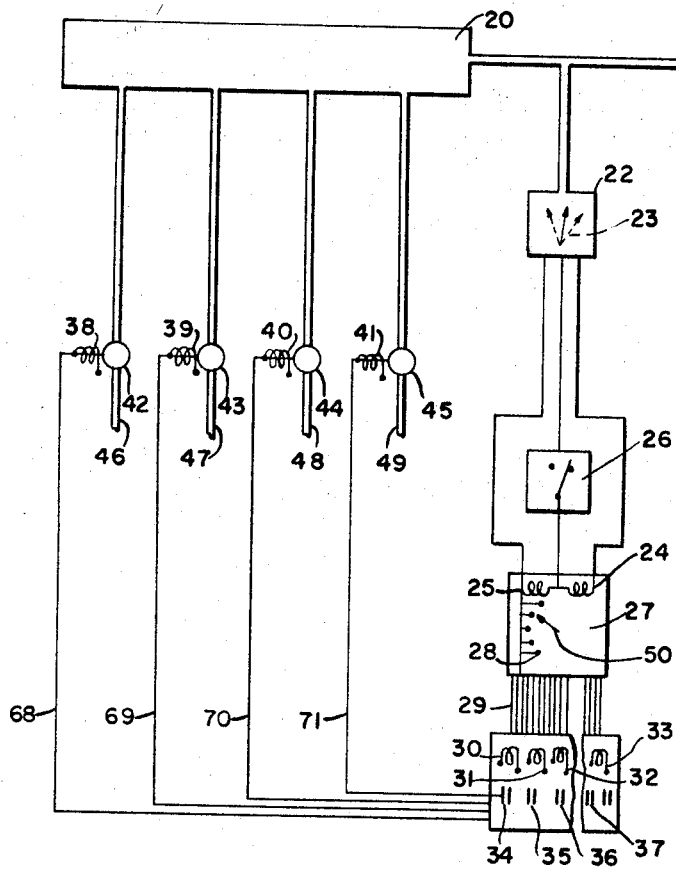
FIGURE 1 is a diagrammatic illustration of the control of a fluid flow to a manifold for supply of fluids to a demand operation.
FIG. 2 is a typical chart of the operation of the valve control on a plurality of fluid sources.

Referring to the drawings, in FIG. 1, 20 represents a manifold that supplies fluid to the demand 21. A variable pressure testing device 22 determines the pressure in the demand line and comprises two adjustable contacts 23 which are movable in relation to the variable testing device 22. For example, the pressure variation may for instance be from 0.5 p.s.i.g. to 0.8 p.s.i.g. The contacts 23 are movable over the range of operation of the variable testing device so that the contacts can be set for any portion of the testing range 22. The contacts 23 are opened or closed respectively at the extremes of the present variation that is set for the allowable limits of pressure variation. One of the contacts 23 is connected to a coil 24 and the other contact is connected to a coil 25. Disposed in the neutral line to the contact 23 is a periodic operating switch operated by a clockwork. The coils 24 and 25 are disposed to operate the rotary switch 27. The rotary switch 27 comprises a plurality of contacts 28 and each of the contacts is connected by a line 29 to the relays 30, 31, 32 and 33. The relays operate the switches 34, 35, 36 and 37. The operation of the relays 30, 31, 32 and 33 will be described more fully with relation to FIG. 3. The switches 34, 35, 36 and 37 are connected to valve operating solenoids 38, 39, 40 and 41 of the valves 42, 43, 44 and 45 that control a supply of fluids to the manifold 20.

In the illustration in FIG. 1, there has been shown four source lines 46, 47, 48 and 49 for basis of illustration. It is to be understood that the number of source lines 46, 47, 48 and 49 can be any number desired for a particular operation. The number of source lines used is determined by two factors, one, the range of pressure that is expected to be encountered in the demand line 21, and second, by the variation that is desired in the control of the pressure to the demand line 21. The size of the source fluid lines and/or the openings in the valves 42, 43, 44 and 45 can also be varied to control the supply of fluid to the manifold 20. Many combinations of size variations are obvious in the source lines 46, 47, 48 and 49 and the openings of the valves 42, 43, 44 and 45. This size variation can be, for example, a geometric arrangement as 1, 2, 4 and 8 or each of the source lines can be of the same size, or to give a size relation of 1, 2, 3 and 4, or if desired, one or more of the source lines can depart from the ratio of size relation outlined above.

The valves 42, 43, 44 and 45 are designed to be operated between two positions, namely, open or closed. Further, it is to be noted that this operation of the valves 42, 43, 44 and 45 gives a very wide range of pressure variation to the pressure in the manifold 20. For example, in FIG. 2 is illustrated how the three valves, such as 42, 43, and 44, or with four valves 42, 43, 44 and 45 one may operate these valves independently or together in cooperation to give a variation of fluid flow to the manifold 20. With the valves 42, 43 and 44 it is to be noted that the stepped variation runs from 1 to 7 and with four valves one may have 15 steps in the variation of source supply. While FIG. 2 shows only a maximum of four valves, the number of valves is not limited to four.

The rotary switch 27 is more fully illustrated in FIG. 3, wherein the coils 24 and 25 are illustrated that operate the rotary switch arm 50 to make contact with the contacts 1 through 15 corresponding to the contacts 28 in FIG. 1. The switch arm 50 is moved in one step only in each direction upon actuation by either coil 24 or 25. These contacts 1 to 15 are connected through operating coils 51 through 65 of the relays, that operate the relay contacts 66 in the relay boxes 67. The relays in boxes 67 connected to the contacts 1 through 15 are alike except for the number of contacts in each box. It is to be noted that the contacts in each box vary between 1 and 4 when one uses four fluid source lines, between 1 and 5 when one uses five fluid source lines, etc. If there are only three fluid source lines then there would be only seven relay boxes and no more than three switches to each box. The contacts 66 are connected to the electrical lines 68, 69, 70 and 71, that operate the solenoids 38 through 41. The valve operation to attain the presure variation desired is shown in FIG. 2 for three and four valves, but the number of valves is not limited to four.

The operation of the apparatus and the method for accomplishing the object of this invention by the device shown in FIG. 1 is as follows: the variable testing device 22, having been set for a particular desired operating pressure in the demand line 21 and the contacts set for the pressure variation permitted, the device will work as follows: if the pressure in the demand line 21 drops, the low pressure contact 22 energizes the coil 25 which will cause the switch arm 50 to move one step, for example, from the contact 3 to the contact 2 to thereby close the three contacts in the relay 67 connected to the lines 69, 70 and 71 which will operate the valves 43, 44 and 45 and increase the pressure in the manifold 20. Likewise, if the pressure in the demand line 21 increases, the other contact 23, will be energized and energize the coils 25 to cause the switch arm 50 to move from the contact 3 to the contact 4. This will operate the valves 44 and 45, thereby reducing the pressure of the fluid going to the manifold 20. With the change of pressure only one step motion of the switch 50 has taken place. This is controlled by the periodic operating switch 26 in the neutral line. The periodic operation of the switch 26 may be varied so that its operation is in the range of 5 to 150 seconds, or in other words the contact 23 will cause operation of the coils 24 and 25 once for each of the periods that may be varied between 5 and 150 seconds. The periodic operating switch 26 serves a very useful function in controlling the parts of the device and preventing "hunting." Without the periodic operating switch 26 the rotary switch 50 would be moving constantly among the contacts 1 through 15 and would soon cause serious arcing of the contact and the early failure of the rotary switch 27 and the contact 23. Further by adjusting manually or automatically the period it is possible to closely coordinate the change of rate of flow to the change of rate of the demand.

It is to be understood that while FIG. 1 shows the direct supply of a fluid from lines 46, 47, 48 and 49 direct to the manifold 20 these lines may have incorporated therein a jet compressor for mixing a fluid into the lines 46, 47, 48 and 49 in harmony with the jet compressors shown in FIG. 4. The fluid mixed by the jet compressor may be the same or different as to composition, pressure, temperature, etc.

The device as illustrated in FIG. 4 is a variation of that illustrated in FIG. 1 and represents a great improvement over the device illustrated in FIG. 1 with this system. In supplying a fluid by means of a jet compressor it is difficult to exercise the proper control over the jet compressor so that it operates at its most efficient operating pressure. A jet compressor operates most efficiently when the back pressure on the jet compressor is maintained constant. If the back pressure is allowed to vary, then the jet compressor becomes either inefficient or inoperative in inducing the second fluid into the system. With the arrangement shown in FIG. 4, this difficulty is overcome by providing that each jet compressor is always operating at its most efficient condition and the fluid supplied is constant as to the above noted variables, i.e. pressure, temperature and composition.

In FIG. 4 are shown four jet compressors 72, 73, 74 and 75, which are supplied with a fluid from the source lines 76, 77, 78 and 79 from the same type of source shown in FIG. 1 by the lines 46 through 49. The source lines 76 through 79 are controlled in the same manner as the lines 46 through 49, are controlled in FIG. 1 by a variable testing device 22 having contacts 23 and connected to coils 24 and 25 in the rotary switch 27. The rotary switch 27 is connected to the relays 30, 31, 32 and 33 to operate the contacts 34 to 37 and the solenoids 38, 39, 40 and 41, in the same manner as has been described above to operate the device illustrated in FIG. 1. In addition the jet compressors 72 through 75 are provided with the valves 80, 81, 82 and 83 to control the fluid supply to the manifold 84. The valves 80 to 83 are manually operated and are used for repair or maintenance of the jets. The latter arrangement is shown in FIG. 4. The other fluid supplied to the jet compressors 72 through 75 is connected to a header 85. The supply lines connecting the header 85 to the jet compressor may have manual or automatic valve controls for valves 77, 78, 79 and 80, in their lines in addition to the check valves 86, 87, 88 and 89. The header 85 may be connected directly to the atmospheric air, for example, that may be supplied to the header 85 or the header may be connected to another source of fluid that is to be picked up by the jet compressors 72 through 75. In either type of fluid supplied to the header 85 there may be disposed a valve 90 that is controlled in a similar manner to the source fluid line. Specifically, the valve 90 may be controlled by a relay 91 that is controlled by a periodic operating switch 92 of the same type as the periodic operating siwtch 26. Likewise, its period of operation is variable between 5 and 150 seconds. The periodic operating switch 92 is connected to a variable testing device 93 of the same type of the variable testing device 22 (shown in FIG. 1). The variable testing device 93 is connected to the manifold 84 by line 94. The variable testing device 93 can also be set so that its contacts will operate between any two desired pressure variations in the line 94. Upon operation of either the decrease or increase contacts of the variable testing device 93 controlled by the periodic operating switch 92, either there will be an opening or closing the valve 90 by the solenoid 91. Also connected to the manifold 84 is the line 95 and another variable testing device 96 and the periodic operating switch 97 connected to the solenoid 98 and the valve 99. The variations in pressure in the manifold 84 therefore can be utilized to control the fluid going through the header 100 in the manner as described for the control of the fluid supply to the header 85.

A further modification is that the periodic operating switch 92, the variable testing device 93 and the line 94 can be omitted and the relay 91 can be omitted and the relay 91 operated by the same devices that operate the valve 99.

In some cases it may be desirable that the fluid supplied to the header 100 may comprise a volatilizable fluid. In such cases the volatilizable fluid may be supplied by the line 101 passing through the valve 102 and controlled by the solenoid 103 connected to the same line that controls the solenoid 98. The fluid controlled by the valve 102 passes through the heat exchanger 104 for volatilizing or heat exchange of the fluid which is then passed to a line 105 going to the header 100. Further, the heat exchange fluid supplied to the heat exchanger 104 by the line 106 is controlled by the control 107 operated by the device 108 and the device 108 may be controlled by the electrical circuit controlling solenoid 98. If there is a fluid supplied by the line 106 to the heat exchanger 104 the exit of the heat exchanger will leave the heat exchanger 104 by the line 109. It is obvious that the heat exchange medium supplied by the line 106 can be a fluid or some other form of energy such as electric energy and therefore the device 108 will be varied in accordance with the type of heat exchange medium used.

The variations of the fluid or fluids supplied to the manifold 85 can be further varied by providing a clockwork mechanism that will vary the period of operation of the periodic operating switches 22, 92 or 97 or any combination of the switches during the hours of the day. Likewise the periodic operating switches can be controlled by a clockwork mechanism to vary their period of operation during a day to vary the pressure, composition or temperature of the fluid supplied to the header 85 or 100.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. The method of controlling the mixing and supply of a liquid to a demand that varies in the supply line, comprising; providing a plurality of fluid sources to a supply line, wherein the flow rate of each fluid source is independent of the flow rate of the other members of the plurality of sources, connecting each member of the plurality of sources to the supply line so that the number of sources operating simultaneously governs the total flow rate, periodically determining the pressure in the supply line at a preset time interval and comparing this pressure with a preset normal pressure for the supply line operation, and periodically controlling the total flow rate by deviation from said preset normal pressure at said preset timed intervals.

2. The method of claim 1 wherein the operation of the deviation from the preset point is performed once for each period of control.

3. The method of claim 1 wherein the period of periodic operation of control of the deviation from the set point of the sources can be varied and adjusted to the speed of change of the rate of flow in the supply line.

4. The method of claim 1 wherein the period of periodic operation of the control of the sources is varied between 5 and 150 seconds.

5. The method of claim 1 wherein the flow in fluid sources aspirates a flow of a fluid from a second source into the supply line.

6. The method of claim 5 wherein the operation of the control of the sources is performed once for each period from the preset point.

7. The method of claim 5 wherein the period of periodic operation of control of the sources can be varied and adjusted to the speed of changes in the supply line.

8. The method of claim 1, wherein the means to control the total flow rate is an electronic means which is supplied current at said preset timed intervals.

9. An apparatus for use in controlling the flow of a fluid from a source to a demand that varies in volume and pressure with time, comprising plural sources feeding into a manifold that supplies the demand, valve means for separately controlling each of the plural sources, means for determining the fluid pressure of the demand, means actuated by the determining means to produce a signal only when the pressure departs from a predetermined pressure, a periodically operated switch means to control the timing of the signal producing means, means operated by the signal and controlled by the periodic switch to indicate the deviation once for each operation of the predetermined pressure, means responsive to the signal to actuate the said valve means to control the flow into a manifold and thereby make a correction in the pressure each time the period switch operates.

10. An apparatus as set forth in claim 9, wherein a jet compressor is disposed in each of the plural sources to aspirate a fluid into the manifold.

11. An apparatus as set forth in claim 10, wherein a separate means is used to determine the pressure in the manifold to produce a signal and control the fluid flow to the jet compressor and means to periodically interrupt the signal produced by the separate means that determines the pressure in the manifold.

12. An apparatus as in claim 10 wherein a heat exchanger is positioned to heat the fluid passed to the fluid sources and a separate means is used to determine the pressure in the manifold to produce a signal and control the flow of the fluid source through the heat exchanger, means to periodically interrupt the signal produced by the separate means that determines the pressure in the manifold, and means to vary the length of the period of the periodic interruption of the signal during the hours of the day.

13. The apparatus of claim 9 wherein said control means comprises pressure indicating means having an adjustable preset moveable pointer pneumatically connected to the manifold, a low pressure adjustable electric contact and a high pressure adjustable electric contact, said high pressure contact contacting a pressure retreating control coil of a rotary switch and said low pressure contact contacting a pressure advance control coil of said rotary switch, a timed off-on interrupter having an adjustable timed period which sends an electrical signal to said rotary switch, a plurality of contacts in said rotary switch, each contact connected to a relay which controls the operation of a separate fluid control valve.

References Cited

UNITED STATES PATENTS

| | | | |
|---|---|---|---|
| 2,873,180 | 2/1959 | Gilbert | 230—111 |
| 2,979,066 | 4/1961 | Christie | 137—93 |
| 3,045,893 | 7/1962 | Young | 230—95 |
| 3,072,146 | 1/1963 | Gizeski | 235—200 |

ALAN COHAN, *Primary Examiner.*

HOWARD M. COHN, *Assistant Examiner.*

U.S. Cl. X.R.

137—487.5, 552.5, 609, 624.13